A. C. & T. R. BELL.
ALTERNATING CURRENT MOTOR.
APPLICATION FILED FEB. 27, 1913. RENEWED JUNE 2, 1917.
1,239,761.
Patented Sept. 11, 1917.
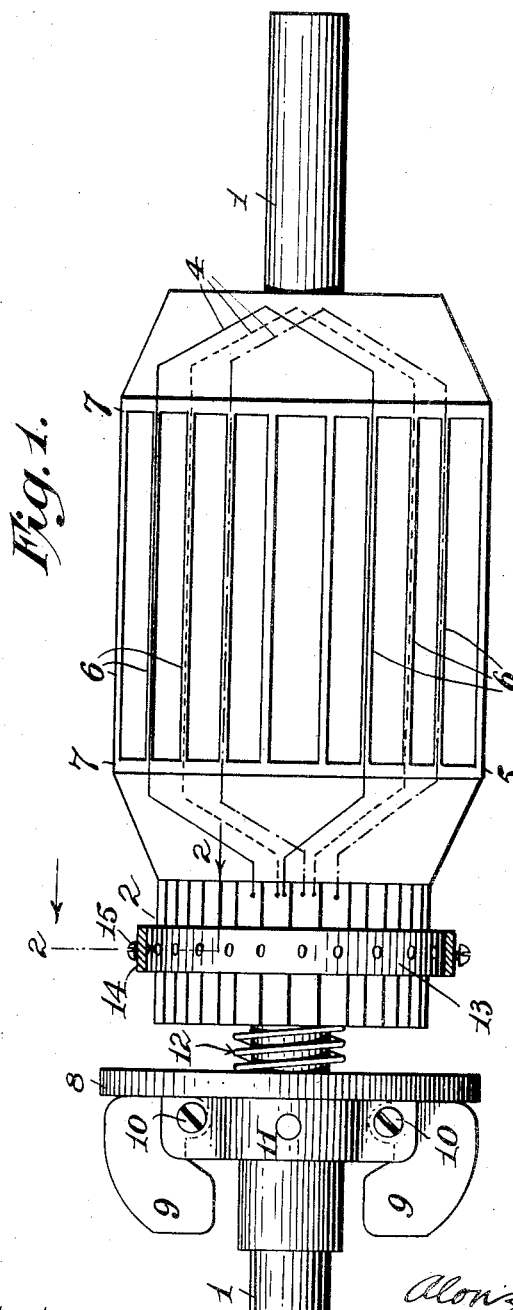
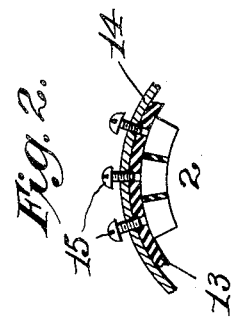
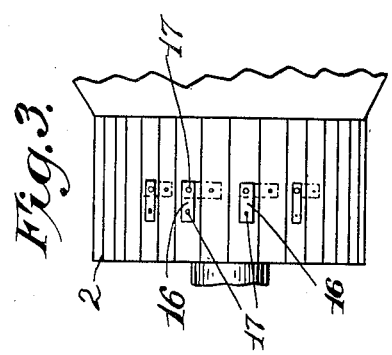
Attest:
Ezra P. Moreland
Clarence G. Campbell
Alonzo C. Bell
and Thaddeus R. Bell Inventors.
by
E. W. Scherr Jr, Atty.

UNITED STATES PATENT OFFICE.

ALONZO C. BELL AND THADDEUS R. BELL, OF WESTFIELD, NEW JERSEY.

ALTERNATING-CURRENT MOTOR.

1,239,761.   Specification of Letters Patent.   Patented Sept. 11, 1917.

Application filed February 27, 1913, Serial No. 750,953. Renewed June 2, 1917. Serial No. 172,523.

*To all whom it may concern:*

Be it known that we, ALONZO C. BELL and THADDEUS R. BELL, citizens of the United States, residing at Westfield, in the county of Union and State of New Jersey, have invented certain new and useful Improvements in Alternating-Current Motors, of which the following is a specification.

Our present invention relates to improvements in polyphase electric motors and relates especially to the automatic starting of such motors with initial torque sufficient to overcome the load but without excessive rush of current in the rotor. We thereby avoid the necessity of the compensator or starter usually used in connection with polyphase motors. Our improvements further contemplate features as follows: When the rotor is approaching or has arrived at full speed, the active cross section of the conductors therein is automatically increased so as to carry the increased current without overheating. Further, our improvements comprise features which give our motor an exceptionally high power factor.

The precise nature of our improvements will be understood by those skilled in the art from the following description in connection with the drawings which, however, show only one of the specific forms or embodiments which our improvements are adapted to take.

In the drawings, Figure 1 is a side elevation of a rotor for a polyphase motor within our invention, said figure being diagrammatic as to the squirrel cage and the armature windings for the sake of greater clearness; Fig. 2 is a partial cross-section of the line 2—2 in Fig. 1; and Fig. 3 is a side view of a commutator to which a modified form of the segment bridging or connecting means is applied.

We will now describe the specific devices of the drawings, reserving it to the claims to point out the novel features and to define the scope of the invention, it being understood that the claims will be given the due range of equivalents to which they may be entitled in view of the art.

We have not illustrated the stator part of the motor because this may be of any ordinary or preferred kind. The particular rotor shown within our invention is made up as follows: 1 is the motor shaft, 2 and ordinary commutator; 3 designates as an entirety what may be either an ordinary lap, wave or drum-wound armature or their equivalents for the purposes of this invention wherein the ends of the individual coils 4, 4 shown merely diagrammatically) are brought out to,—that is, are connected with—the commutator segments in any usual or preferred manner.

Of course, the armature has a laminated-iron slotted core or foundation which we have not shown because it is so well known and forms no novel part of our invention, said slots as usual receiving and housing the several coils 4, 4.

5 designates as an entirety a squirrel cage consisting of bars 6 located preferably in the top of the slots over the coils 4. Rings 7, 7 unite the ends of these bars. Both the bars and the rings consist preferably of the best electrical copper united with minimum resistance at the joints for reasons which will subsequently appear.

The squirrel cage 5 for the purposes of our invention is made with small cross-sectioned conductors so that it will carry sufficient induced current for the rotor in starting to overcome the load, but shall prevent any rush or great excess of current during starting.

However, this squirrel cage would be too light to carry the large current which the rotor must carry when up to speed under load, and therefore at this time or prior thereto we cause the commutator bars to be automatically short-circuited by a copper plate 8 forced against their ends. This results in short-circuiting the armature coils or in their conversion into closed conductors which now so supplement the squirrel cage in carrying the induced current that the rotor thereafter carries the full load efficiently without overheating.

The illustrated means for operating this short-circuiting plate 8 is the same as that patented by one of us in United States Patent No. 1,015,534, of Jan. 23, 1912, and in foreign countries, and comprises the specially formed elbow levers 9, 9 pivoted at 10 to a member mounted in transverse position on the shaft so that, when the rotor approaches full speed but not before, these weights fly out centrifugally and force the plate 8 into short-circuiting position. Reversely, when the motor is being stopped, this plate is forced out of short-circuiting position by the spiral spring 12.

A further important part of our present improvements is the following: 13 is a ring of fiber or other insulating material snugly surrounding the commutator; 14 is a copper ring surrounding this fiber ring, and 15, 15 are a plurality of good-conducting screws tapped through the copper and fiber rings severally over the individual commutator bars so that they can be screwed into electrical contact therewith. It will now be apparent that if the particular two screws be screwed into contact with the commutator bars to which the ends of any given coil 4 are attached, and if this same thing be done with other screws, then additional closed conductors can be provided to supplement to any desired extent the squirrel cage to receive the induced current in starting so as to overcome the load. This makes it possible to adjust the total amount of the permanently closed circuits in the rotor so that said rotor will have an all-sufficient starting torque to overcome the load, whatever that may be. Thus, the motor sent out by the manufacturer will have the squirrel cage for the rotor to start up on, and this in many cases will be sufficient, but in other cases the particular conditions of the load and the special nature of the work may be such that the squirrel cage alone is insufficient to permit the motor to start or, at any rate, to come up to speed, and it is in these cases that the screws 15 will be used as above described in sufficient number to increase the permanently closed circuits so that the rotor will properly come up to speed as it should.

Our present motor has a decidedly higher power factor than the usual polyphase motor having a mere unsupplemented heavy squirrel cage to take care of both starting and running the motor when at speed. In such motors, the end rings of the cage are purposely made of brass or other metal of some resistance, to increase the resistance of the cage. This is advantageous in checking the rush of current in starting, but is disadvantageous when the rotor is up to speed because the resistance, although it would be relatively slight to a current of higher voltage, is nevertheless considerable to the induced current in the rotor with its relatively very low voltage and high amperage, and this is so disadvantageous that it seriously impairs the power factor of the motor. Our motor has a high power factor because our squirrel cage, for the purpose of our invention, being light and therefore sufficiently resistive during starting to prevent any rush of current, can be made of copper throughout, as can also be made the subsequently closed conductors. Therefore, the total rotor resistance in our motor is adapted to be less than that in the other motors referred to, and the power factor in our motor is thereby considerably increased.

The described ring 14 and related devices is only one of the means adapted to be used for the described purpose of electrically bridging at will a suitable number of pairs of segments to short-circuit on themselves the desired or required number of coils of the armature to sufficiently supplement the squirrel cage to effect the proper starting of the motor under load. Thus, other means can be employed with advantage, such as the means shown in Fig. 3 where a plurality of conducting parts such as short strips of copper 16, are provided, each carried by one of the commutator segments. 17, 17 are screws tapped through the ends of each part 16 into the commutator bar which carries the part 16. When the conducting parts are in the position shown by the full lines in Fig. 3, they are out of employment because they are not short-circuiting any of the armature coils to supplement the squirrel cage. However, they are there, ready to be used whenever the occasion arises, and to do this, one of the screws 16 is loosened and the conducting part is then swiveled about the other screw so as to extend over an adjacent commutator bar with its screw hole in alinement with a corresponding hole in said bar, thereby permitting the screw 16 to be screwed into place to secure the conducting part in its short-circuiting position. The dotted lines in the figure show the parts in this position. Of course, many or few of these parts may be provided but ordinarily three or four will be found sufficient for the practical carrying out of the invention.

What we claim is:

1. The combination in motors of the class described of a rotor comprising a light squirrel cage adapted to starting; a wound armature in which the ends of the coils are contact members or segments; means for automatically short-circuiting said segments from the speed of rotation of the motor; and a conductor adjacent said segments having a plurality of independent means corresponding to the segments adapted individually to be brought into electrical contact therewith.

2. The combination in motors of the class described of a rotor comprising a commutator; a wound armature in which the ends of the coils are brought out to the segments of the commutator; a conducting ring mounted in concentric position relative to the commutator and having a plurality of independent conducting members each adapted to be adjusted into and out of contact with the adjacent commutator segment.

3. The combination in motors of the class described of a rotor comprising a light squirrel cage adapted to starting; a wound armature in which the ends of the coils are contact members or segments; means for automatically short-circuiting said segments from the speed of rotation of the motor; and conducting means adjustable to connect or disconnect the segments corresponding to some of the armature coils in order to supplement the squirrel cage.

In testimony whereof we affix our signatures in presence of two witnesses to each signature.

ALONZO C. BELL.
THADDEUS R. BELL.

Witnesses:
E. W. SCHERR, Jr.,
EDNA R. MORELAND.